United States Patent [19]

Daub

[11] Patent Number: 5,103,143
[45] Date of Patent: Apr. 7, 1992

[54] PROCESS AND APPARATUS FOR STARTING A HIGH PRESSURE GAS DISCHARGE LAMP FOR VEHICLES

[75] Inventor: Wolfgang Daub, Lippstadt, Fed. Rep. of Germany

[73] Assignee: Hella KG Hueck & Co., Fed. Rep. of Germany

[21] Appl. No.: 699,339

[22] Filed: May 13, 1991

[30] Foreign Application Priority Data

May 14, 1990 [DE] Fed. Rep. of Germany ....... 4015398

[51] Int. Cl.$^5$ ..................... H05B 37/02; H05B 41/36
[52] U.S. Cl. ................................. 315/308; 315/224; 315/287; 315/307; 315/DIG. 2
[58] Field of Search ............... 315/307, 308, 287, 224, 315/82, 360, DIG. 2

[56] References Cited

U.S. PATENT DOCUMENTS

| | | | |
|---|---|---|---|
| 3,913,002 | 10/1975 | Steigerwald et al. | 315/224 |
| 4,004,188 | 1/1977 | Cooper | 315/224 X |
| 4,039,897 | 8/1977 | Dragoset | 315/307 X |
| 4,240,009 | 12/1980 | Paul | 315/224 |
| 4,511,195 | 4/1985 | Barter | 315/308 |
| 4,700,113 | 10/1987 | Stupp et al. | 315/224 |
| 4,717,863 | 1/1988 | Zeiler | 315/307 |
| 5,010,279 | 4/1991 | Lathom et al. | 315/307 X |
| 5,036,256 | 7/1991 | Garrison et al. | 315/308 |
| 5,039,921 | 8/1991 | Kakitani | 315/307 |
| 5,046,152 | 9/1991 | Bartscher | 315/307 |

FOREIGN PATENT DOCUMENTS

0350104A2 1/1990 European Pat. Off. .
3729383A1 3/1989 Fed. Rep. of Germany .

Primary Examiner—Eugene R. LaRoche
Assistant Examiner—Son Dinh
Attorney, Agent, or Firm—Griffin Branigan & Butler

[57] ABSTRACT

In a process for starting a high pressure gas discharge lamp (GDL) of a motor vehicle of a type for which an alternating voltage is developed from a direct voltage, the alternating voltage being fed to an ignition device to ignite the high pressure gas discharge lamp, a lamp voltage and/or a lamp current is measured, an actual value based on lamp current and/or lamp voltage is compared with a desired value and after ignition of the high pressure gas discharge lamp for a predetermined time span, or period, an additional power is added to an operational power of the high pressure gas discharge lamp by means of changes in the alternating voltage which, on the one hand, is limited by a maximum permissible lamp current and on the other hand is terminated at the end of the predetermined time span. A status value is formed including "lamp on" and "lamp off" values, the actual value is a lamp actual-power-value and the desired value is a lamp desired-power-value, after ignition the additional power produced increases with increasing off time and with decreasing time duration of the last on time and the time span of effectiveness of the additional power increases with increasing off time and with decreasing time duration of the last on time of the high pressure gas discharge lamp.

16 Claims, 3 Drawing Sheets

PROCESS AND APPARATUS FOR STARTING A HIGH PRESSURE GAS DISCHARGE LAMP FOR VEHICLES

BACKGROUND OF THE INVENTION

This invention concerns a process for starting, or start-up of, a high pressure gas discharge lamp for motor vehicles in which an alternating voltage is developed from a direct voltage, the alternating voltage is fed to an ignition device to ignite the high pressure gas discharge lamp, a lamp voltage and/or a lamp current is measured, an actual value of the lamp current and/or voltage is compared with a desired value and for a predetermined time span after ignition of the high pressure gas discharge lamp an additional power is added to an operating power of the high pressure gas discharge lamp by means of changing the alternating voltage which, on one hand, is limited by a maximum permissible lamp current and, on the other hand, is reduced after elapse of the predetermined time span. The invention also concerns an apparatus therefor as per the preamble of claims 10 and 14.

From German Offenlegungsschrift DE-OS 37 29 383, concerning a switching, or circuit, arrangement to start a high pressure gas discharge lamp, a process is known for starting a high pressure gas discharge lamp in which an alternating voltage is developed from a direct voltage and this alternating voltage is fed to an ignition device for igniting a high pressure gas discharge lamp. In a circuit of the lamp and in an alternating voltage producer, or converter, voltages are measured which are compared as actual values with desired values and, in dependence thereon, power fed to the lamp is changed. So that the lamp achieves, with high dependability, a stable operational condition after ignition, an additional power is added to operational power fed to the high pressure gas discharge lamp by means of changes in the alternating voltage for a predetermined time period dependent upon a measured actual voltage value. The changes in the alternating voltage result from increases of a monitored start condition during and directly after ignition of the high pressure gas discharge lamp as opposed to a sensed condition during normal operation.

It has shown itself to be disadvantageous for the high pressure gas discharge lamp, after ignition, to be fed a constant or uniform additional power during which the high pressure gas discharge lamp, in particular after only a short interruption of operation, upon being switched on gives off a high light strength which can lead to a blinding effect, which, in particular for motor vehicles, can lead to dangerous situations.

In addition, it has proven to be disadvantageous that the high pressure gas discharge lamp according to various existing start-up conditions commences operation with various light strengths and thereby does not achieve a possibly quicker, or a uniform, steady increase of light strength as quickly as possible.

The circuit arrangement comprises a direct voltage source which is connected to an alternating voltage producer, or converter, an ignition device between the alternating voltage converter and the high pressure gas discharge lamp, at least one voltage measuring device in a lamp circuit and a comparator which controls the alternating voltage producer in order to change the alternating voltage.

An object of this invention is to provide a process and an apparatus for starting high pressure gas discharge lamps in motor vehicles that are uncomplicated and cost effective and that assure that the high pressure gas discharge lamps reach their optimal operational conditions independently of start-up conditions as quickly as possible, without exceeding desired light outputs, thereby causing a blinding effects, with even, regular increases of light power outputs.

SUMMARY OF THE INVENTION

According to principles of this invention, a process to ignite a high pressure gas discharge lamp in a motor vehicle involves forming a status value, that is "lamp on" and "lamp off", having an actual value which is a lamp actual-power-value, having a desired value which is a lamp desired-power-value, having additional power to produce ignition which increases with an increasing off time and with a decreasing time duration of a last on time and whose time period of effectiveness increases with increasing off time and with decreasing time duration of the last on time of the high pressure gas discharged lamp.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF A PREFERRED EMBODIMENT

Figure 1:
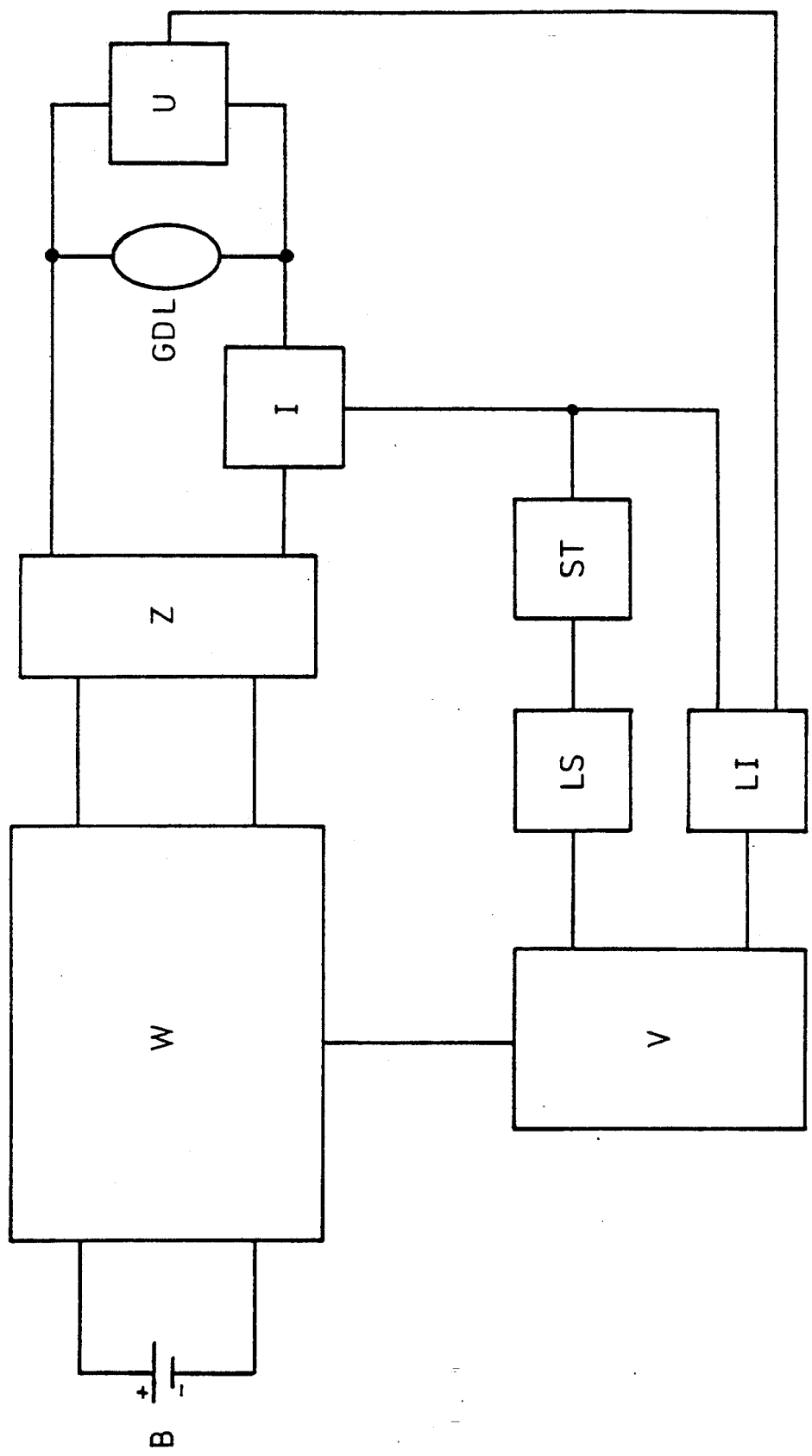
FIG. 1 is a block diagram, with at least one element shown schematically, of an apparatus to start a high pressure gas discharge lamp in accordance with this invention, including the high pressure gas discharge lamp.

FIG. 1 shows a block diagram of apparatus to start a high pressure gas discharge lamp GDL. A direct, or steady voltage source B, which can be a battery of a motor vehicle, is electrically coupled with an alternating voltage producer, or converter, W which produces an alternating voltage from the direct voltage. The produced alternating voltage can be controllable in frequency, in pulse width, and in pulse height, or amplitude, in order to control power, or wattage, or performance. In order to ignite the high pressure gas discharge lamp GDL the alternating voltage producer W is coupled to an ignition device Z, which provides the high pressure gas discharge lamp GDL with an ignition voltage, and during normal operation thereof, with an operating voltage.

In order to determine power, or wattage, to be fed to the high pressure gas discharge lamp GDL, the circuit has an actual-power-value determining device LI which, for one thing is coupled to a voltage measuring device U arranged parallel to the high pressure gas discharge lamp, and for another thing is coupled to a current measuring device I which is arranged in series, or in a loop, with the lamp. The voltage measuring device U produces a voltage value which corresponds to the voltage in, or across, the high pressure gas discharge lamp GDL. The current measuring device I produces a voltage, which corresponds to a current flowing in the lamp circuit. The actual-power-value determining device LI can be a multiplier which, by means of multiplying input signals, forms an actual-power-value which is fed as a voltage signal to a comparator V which is electrically coupled to the alternating voltage producer W for controlling power. The comparator V is, in addition, coupled with a desired-power-value determining device LS which is coupled with the current measuring device I via a status determining device ST. The status determining device ST produces a status value "lamp on", when a predetermined current flows in the lamp circuit. The status determining device ST produces a status value "lamp off", when the current in the lamp circuit falls below a predetermined value.

The comparator V compares the actual-power-value with the desired-power-value and produces a voltage signal that controls the alternating voltage producer W to change the alternating voltage, thereby resulting in a power change. During operation of the high pressure gas discharge lamp GDL such a power controlling results in the benefit that for one thing the power to the high pressure gas discharge lamp GDL, and thereby its brightness, can be regulated and that for another thing the high pressure gas discharge lamp GDL can be operated under optimal conditions.

Particularly during operation of a high pressure gas discharge lamp GDL in motor vehicles to illuminate a street a requirement exists that a desired light power from the high pressure gas discharge lamp can be achieved as soon as possible. For this purpose, an additional power can be supplied to a normal-operation, or steady-operation, power during a start-up phase of the high pressure gas discharge lamp GDL.

According to this invention, this is achieved by the desired-power-value determination device LS which determines a desired-power-value on a characteristic curve field in dependence on measured "on" and "off" times under consideration of, or limited by, a maximum lamp start-up current. Additionally, in an exemplary embodiment, a first time member can be provided that measures "switched off", or "off", time periods of the high pressure gas discharge lamp GDL. Further, a second time member can be provided that measures the duration of time of the last "switched on", or "on", periods of the high pressure gas discharge lamp. The time members can be controlled, or keyed, by the "lamp on" and "lamp off" status values formed by the status determination device ST. In this manner, it is assured by a particularly uncomplicated and cost effective manner that the high pressure gas discharge lamp GDL is dependably started with a most uniform and smooth increase of light strength to reach an optimum operational condition, independently of a respective switching on, or start-up, condition, as quickly as possible without exceeding a desired light power and thereby without causing blindness during operation of motor vehicles.

Figure 2:
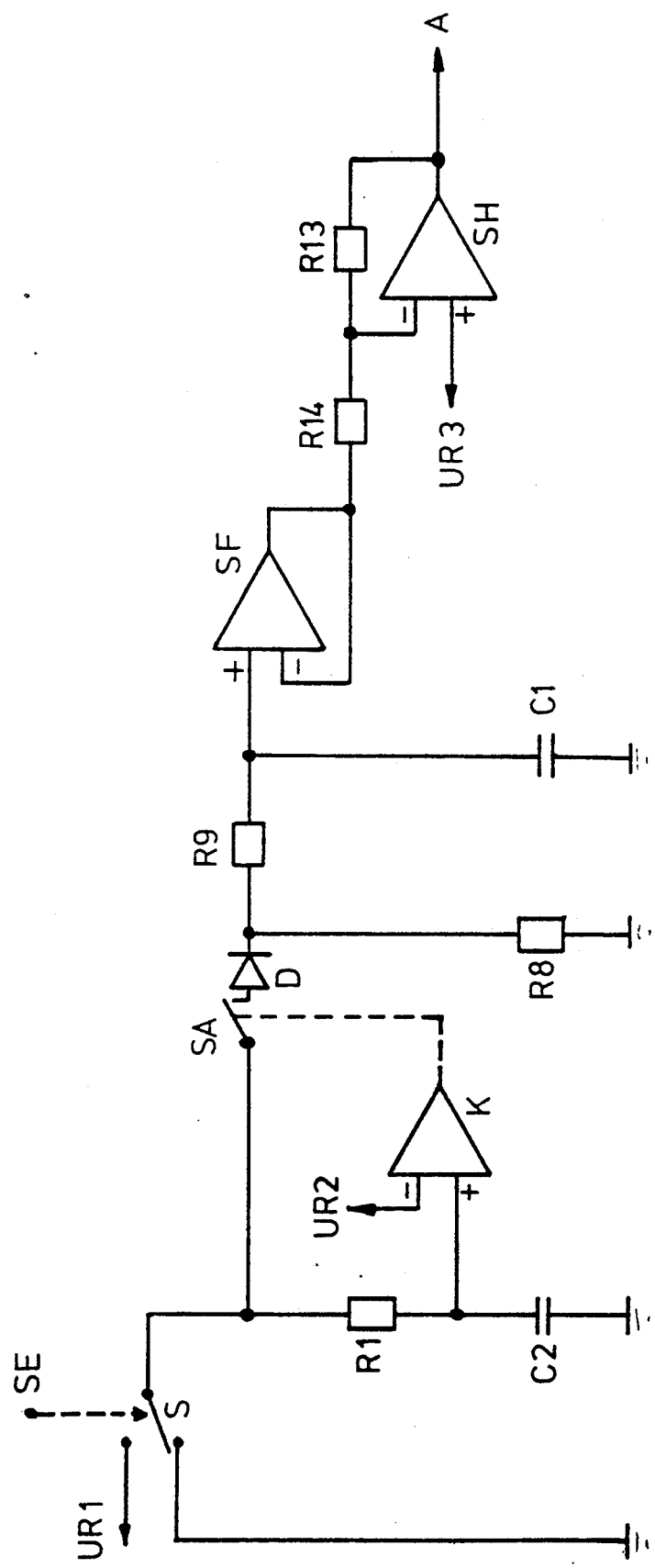
FIG. 2 is a schematic diagram of an exemplary embodiment of a circuit arrangement of an actual-power-value determining device to be used in the circuit of FIG. 1.

FIG. 2 shows a particularly uncomplicated and cost effective embodiment of a circuit arrangement of the desired-power-value determination device LS.

In the switching arrangement depicted in FIG. 2 the status determination device ST is coupled with a control input SE of a switching device S, whose switching paths can couple either a first reference voltage terminal UR1 or ground via a first resistor R1 with a noninverting input of a comparator K. The noninverting input of the comparator K is additionally connected with ground via a second condenser C2. The inverting input of the comparator K is connected to a second reference voltage terminal UR2. The output of the comparator K is here coupled, for example, with a switch SA whose switching path can connect the first reference voltage terminal UR1 via a blocking, or obstructing, member D (diode) for one thing via a ninth resistor R9 to a noninverting input of an ideal voltage follower, or transmitter, SF and for another thing via an eighth resistor R8 to ground. The noninverting input of the voltage follower SF is connected with ground via a first condenser C1.

The output of the voltage follower SF is for one thing connected with an inverting input of the voltage follower SF and for another thing, via a fourteenth resistor R14, with an inverting input of a subtractor SH. The noninverting input of the subtractor SH is connected with a third reference voltage terminal UR3. The output of the subtractor SH is for one thing connected via a thirteenth resistor R13 with the inverting input of the subtractor SH and for another thing with an output A which is joined to the comparator V of FIG. 1.

With use of the power diagram displayed in FIG. 3, a description of the process and an embodiment of the apparatus will be described in more detail below.

Figure 3:
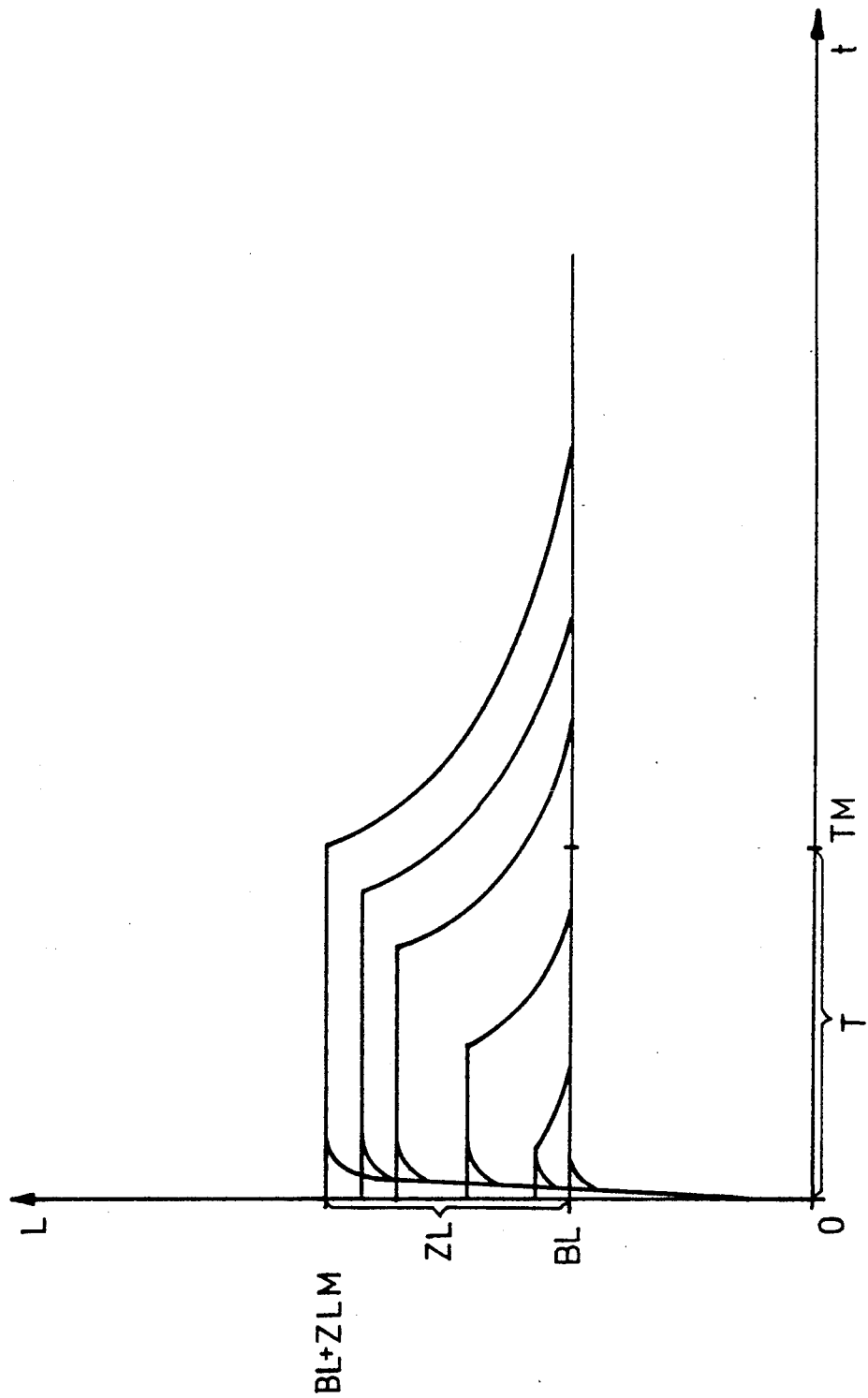
FIG. 3 is a diagram of power for the high pressure gas discharge lamp of FIG. 1.

FIG. 3 is a diagram in which the abscissa is a time axis designated with t, and the ordinate represents power L. For the high pressure gas discharge lamp GDL an operation power BL, which assumes a constant or variable power value, is necessary for optimal operation. After ignition of the high pressure gas discharge lamp GDL, in order to assure a quick and dependable start, an additional power ZL, additional to the operational power BL, will be made available. The height, or amplitude, of the additional power ZL varies thereby between zero and a maximum additional value ZLM in dependence on the "off" time, or period, and the time duration of the last "on" period of the high pressure gas discharge lamp GDL. The time span T of the effectiveness of the additional power ZL varies between 0 time and a maximum time span TM in dependence on the switched off time, or "off" time, and the time of the last "on" period of the high pressure gas discharge lamp GDL. Over the time span T of the effectiveness of the additional power ZL, the additional power ZL here, for example, assumes on a constant value. Because there is a maximum permissible start-up current, the lamp power, immediately after ignition, is additionally limited as is shown in FIG. 3 for example. The additional power ZL will be decreased continuously after completion of the time span T, for example, until the normal operation power BL is reached to prevent swings in brightness of the high pressure gas discharge lamp GDL from appearing. Thus, a group, or family, of curves results which represent a field of characteristic curves varying with, or depending on, the "off" time and the time span, or duration, of the last on period of the high pressure gas discharge lamp GDL. These curves can be measured or calculated. The producing additional power ZL increases with increasing switched off time and with decreasing time duration of the last switched on time and the time span T of the effectiveness of the additional power ZL increases with increasing switched o off time and with decreasing time span of the last switched on time of the high pressure gas discharge lamp GDL. Such a field of characteristic curves can, as described for FIG. 3, be stored in a field-of-characteristic-curve memory of the desired-power-value determination device LS. The desired-power-value determination device LS can have available to it a time member that, in dependence upon the status values from the status determination device ST, measures the switched off, or off, time of the high pressure gas discharge lamp GDL since the last "turn off". A second time member can, in dependence upon the status values of the status determination device ST, measure the time span of the last switched on, or on, time of the high pressure gas discharge lamp GDL. In dependence on signals from the first and the second time members, the additional power ZL corresponding to a curve from the stored field of characteristic curves is then produced by the alternating voltage producer W.

If the high pressure gas discharge lamp GDL was out of operation for a long time, an thereby in a cold operational condition, the maximum additional power ZLM will be furnished to the high pressure gas discharge lamp GDL. In the other extreme case in which operation of the high pressure gas discharge lamp GDL was only interrupted for a brief period of time and in which the last switched on time period was quite long, only the operational power BL will be fed to the high pressure gas discharge lamp GDL upon a renewed ignition. The form of the curves of FIG. 3 should only be viewed as exemplary, since in particular for other embodiments, the constant characteristics of the additional power ZL over a time period T for effectiveness of the additional power ZL, can correspond to suitable characteristics of operational conditions of the high pressure gas discharge lamp GDL.

The method of operation of the switching arrangement of FIG. 2 is described in greater detail below.

The high pressure gas discharge lamp is at a particular time (t=0) placed in operation and the first reference voltage UR1 is coupled to the desired-power-value determining device LS via the switching device S. At this point in time (t=0) the condensers have no voltage thereon and the first reference voltage UR1, the second reference voltage UR2 and the third reference voltage UR3 reach their expected, or normal, value. A desired voltage US at the output A of the subtractor SH corresponds at this moment to a maximum desired-power-value and amounts to:

$$US = UR3 \cdot (1 + R13/R14).$$

US = Voltage desired value
UR3 = 3d reference voltage value
R13 = resistance value of the 13th resistor (R13)
R14 = resistance value of the 14th resistor (R14)

The second condenser C2 is charged via the first resistor R1 with a first time constant (T1 = R1 · C2). If the voltage of the second condenser C2 reaches the value of the second reference voltage UR2, the comparator K switches the switch SA on, or closed, and the first condenser C1 will be charged via the ninth resistor R9, the blocking member D, and the first reference voltage terminal UR1 with a second time constant (T2 = R9 · C1). The desired voltage US is thereby reduced to:

$$US(t) = UR3 \cdot (1 + R13/R14) - UC1(t) \cdot R13/R14$$

UC1(t) thereby indicates the voltage on the first r C1 as a function of time. US(t) describes the time change of the desired voltage US, that corresponds to the desired-power-value. If the first condenser C1 is charged to the voltage value of the first reference voltage UR1, the desired-power-value, that is the voltage desired value US, corresponds to the operation power BL:

$$US = UR3 \cdot (1 + R13/R14) - UR1 \cdot R13/R14$$

If the high pressure gas discharge lamp GDL is switched off at a point in time (T1 > 0), the switching device S is switched to ground and the second condenser C2 discharges under the first time constant T1 over the first resistor R1. The first condenser C1 discharges over the eighth resistor R8 and the ninth resistor R9 with the third time constant T3, whereby T3 is, T3 = (R8 + R9)·C1.

If the high pressure gas discharge lamp GDL, at a time t2 > t1, is switched on again the above described discharge of stored voltages from the first condenser C1 and the second condenser C2 will be influenced. In this manner the stored voltage of the first condenser C1 determines the size of the additional power ZL and the stored voltage on the second condenser C2 determines a length of time, or duration, that the additional power ZL will be effective.

It is beneficial that a status value is formed which takes on values corresponding to "lamp on" and "lamp off" because in this manner it can be determined in a particularly uncomplicated manner whether the lamp is turned on or turned off and thereby for one thing, the duration of the last "on" time and, for another thing, the "off" period, or time span, can be measured and analyzed.

Because the actual value is the lamp actual-power-value and the desired value is the lamp desired-power-value the benefit results that the power provided to the high pressure gas discharge lamp after ignition and during operation of the high pressure discharge lamp can be regulated with great dependability and exactness.

It is beneficial that after ignition the extra, or additional, power produced increases with an increasing off time and with a decreasing duration of the last on time, whereby, depending on the "on", or normal operating, condition of the high pressure gas discharge lamp, the high pressure gas discharge lamp will be fed an exact additional power which assures that the high pressure discharge lamp reaches its optimum, normal, operation condition as quickly as possible without exceeding a desired light production, or power, and thereby without causing a blinding effect, with a uniform and continuous increase in light strength.

In this regard, it has shown itself to be particularly beneficial that the time period, or duration, of the effectiveness of the additional power increases with an increasing switched off time period and with a decreasing time duration of the last switched on time of the high pressure gas discharge lamp, because in this manner the high pressure gas discharge lamp is only fed an additional power over such a time period which assures that the high pressure gas discharge lamp achieves a stable operating condition which, for one thing, increases the life span of the high pressure discharge lamp and, for another thing, assures that a desired light strength immediately after ignition of the high pressure gas discharge lamp is not exceeded.

In practicing this particularly uncomplicated and cost-effective, practicable, process to start a high pressure gas discharge lamp it has proven itself to be beneficial to form the status values "lamp on" and "lamp off" in dependence upon predetermined values of voltage corresponding to lamp current, whereby, in a particularly uncomplicated and dependable manner, status values to measure the off time and the time span, or duration, of the last on time of the high pressure gas discharge lamp are formed.

Because the lamp actual-power-value is formed by multiplying the lamp voltage by a voltage corresponding to a lamp current, a particularly certain, uncomplicated, and cost effective lamp actual-power-value is formed.

Because a maximum additional power is predetermined there is the benefit that for one thing the life time of the high pressure gas discharge lamp is increased by such careful treatment thereof and for another thing, it is avoided that when the additional power is provided the light strength of the high pressure gas discharge lamp exceeds a desired value.

For these same reasons, it is beneficial that a maximum time span, period, or duration, of the effectiveness of the additional power is predetermined, with the maximum time period being especially chosen so that the high pressure gas discharge lamp reaches with dependability a stable operational condition within this maximum time period.

It is beneficial that for the time period of effectiveness of the additional, or supplemental, power the additional power has an approximately constant value because in this manner it is assured that the light strength of the high pressure gas discharge lamp has a uniform, continuous increase.

Because, at completion of the time period of effectiveness thereof the additional power continually decreases, the benefit results that during decrease of the additional power the light strength of the high pressure gas discharge lamp does not display large swings, or oscillations.

Because the forming of the desired-power-value for the additional power results from stored digital or analog characteristic curve fields, or families, a starting of the high pressure gas discharge lamp by means of a particularly uncomplicated and cost effective embodiment results.

It is beneficial that the forming of the desired-power-value for the additional power results by means of RC-member formed exponential functions, with at least two different time constants, because in this manner a particularly uncomplicated and cost effective embodiment of the process is provided.

The object of the invention is solved by the inventive structure according to claim 10 in that an actual-power-value determining device is coupled for one thing with a current measuring device and a voltage measuring device and for another thing with the comparator, in that a time control desired-power-value determining device for one thing is coupled over a status determining device with the current device and for another thing with the comparator, and in that the desired-power-value determining device has at least two time members.

It is beneficial that an actual-power-value determining device for one thing is coupled to a current measuring device and a voltage measuring device and for another thing with a comparator, because in this manner a particularly uncomplicated and cost effective measuring arrangement to determine an actual-power-value results.

It is beneficial that a time controlled desired-power-value determining device for one thing is coupled via a status determining device to the current measuring device and for another thing with the comparator because in this manner for one thing in a particularly cost effective manner a desired-power-value and an additional power to the operational power can be formed in dependence upon the switched off time and the time duration of the last switched on time of the high pressure gas discharged lamp and for another thing in a particularly uncomplicated and cost effective manner the actual-power-value can be compared with the desired-power-value and the alternating voltage producer can be fed a signal upon whose dependence the alternating voltage can be changed for power increase and power decrease.

In this regard, it is particularly beneficial that the desired-power-value determining device has at least two time members because in this manner in a particularly uncomplicated and cost effective way, in dependence on the switched off times and the time periods of the last switched on times an additional power can be provided after ignition of the high pressure gas discharge lamp which assures that for one thing the high pressure gas discharge lamp achieves a stable operational condition and for another thing that the high pressure gas discharge lamp reaches its optimal operational condition independently from various switching on, start-up, conditions as quickly as possible and without exceeding a desired light output, thereby without a blinding effect, with a particularly uniform, continuously-increasing, light strength.

A particularly uncomplicated and dependable construction of the apparatus results when a first time member measures the switched off, or off, time of the high pressure gas discharge lamp and a second time member measures the time duration of the last switched on, or on, period of the high pressure gas discharge lamp.

In this regard, it is particularly beneficial for the power determining device to determine a desired-power-value utilizing a characteristic curve field in dependence upon measured switched on and off times and a maximum lamp driving current because in this manner, with a high degree of dependability, an optimal operational condition of the high pressure gas discharge lamp can be reached upon each switched on situation and an optimal start-up can be assured.

The object of this invention is solved by the inventive structure according to claim 14 in that an actual-power-value determining device for one thing is coupled to a current measuring device and a voltage measuring device and for another thing to a comparator; in that the time controlled desired-power-value determining device is coupled for one thing via a status determining device with the current measuring device and for another thing with the comparator; in that the desired-power-value determining device has a first condenser coupled with barrier members and/or resistors which, in dependence upon the switched off time and the time duration of the last switched on time of the high pressure gas discharge lamp, determines the amplitude of the additional power to the operational power; and in that the desired-power-value determining device has a second condenser coupled with barrier, or impedance, members and/or resistors which, in dependence upon the switched off time and the time duration of the last switched on time, determines the time period of the effectiveness of the additional power to operational power.

It is beneficial that an actual-power-value determining device for one thing is coupled with a current measuring device and a voltage measuring device and for another thing with a comparator, and that a time controlled desired-power-value determining device for one thing is coupled via a status determining device with the current measuring device and for another thing with the comparator because in this manner a particularly uncomplicated and cost effective apparatus can be created which assures a dependable start-up and operation of a high pressure gas discharge lamp in dependence upon predetermined desired-power-values and measured actual-power-values.

In this regard, it is particularly beneficial that the desired-power-value determining device has a first condenser wired with barrier members and/or resistors which, in dependence upon the switched off time and the time duration of the last switched on time of the high pressure gas discharge lamp, determines the amplitude of the additional power to the operational power and that the desired-power-value determining device has a second condenser wired with barrier members and/or resistors which in dependence upon the switched off times and the 10 time duration of the last switched on time, determines the time period of the effectiveness of the additional power to the operational power, because in this particularly uncomplicated and cost effective manner a dependable start-up of the high pressure gas discharge lamp is achieved and moreover an optimum operational condition of the high pressure gas discharge lamp is achieved, independently of a start-up condition, as quickly as possible and without exceeding a desired light output, or power, and thereby without a blinding effect, with a uniform-as-possible, continuous, increase in light strength.

It is beneficial that the voltage appearing on the first condenser determines the decreasing characteristics of the additional power at the end of a time period of effectiveness of the additional power because, in this manner, swings in light strength during decrease of the additional power will be avoided.

Because: the status determining device is coupled to a control input of a switching device whose switching path can either couple a first reference voltage terminal or ground, via a first resistor, with the noninverting input of a comparator; the noninverting input of the comparator additionally is coupled, via a second condenser, to ground; the inverting input of the comparator is coupled to a second reference voltage terminal; the output of the comparator controls a switch whose switching path can couple the first reference voltage terminal for one thing, via a ninth resistor, to the noninverting input of an ideal voltage follower and for another thing, via an eighth resistor, to ground; the noninverting input of the voltage follower is coupled, via a first condenser, to ground; the output of the voltage follower for one thing is connected to an inverting input of the voltage follower and for another thing, via a fourteenth resistor, is coupled with the noninverting input of a subtractor; the noninverting input of the subtractor is coupled with a third reference voltage terminal; and the output of the subtractor for one thing is coupled, via a thirteenth resistor, to the inverting input of the subtractor and for another thing forms an output which is coupled to the comparator, the benefit of a particularly uncomplicated and cost effective, with high dependability, operating apparatus results.

The embodiments of the invention in which an exclusive property or privilege are claimed or defined as follows:

1. In a process to start a high pressure gas discharge lamp for motor vehicles, of a type in which an alternating voltage is developed from a direct voltage, the alternating voltage is fed to an ignition device for igniting the high pressure gas discharge lamp, a lamp voltage and/or current is measured, an actual value from the lamp voltage and/or current is compared with a desired value, and for a predetermined time span after ignition of the high pressure gas discharge lamp an additional power in addition to an operation power is fed to the high pressure gas discharge lamp in the form of a change in the alternating voltage, which is limited on the one hand by a maximum permissible lamp current and on the other hand is reduced at the end of the predetermined time span;

the improvement wherein a status value including a lamp on and a lamp off value, is formed, the actual value is a lamp power value, the desired value is a lamp desired power value, the additional power for causing ignition is caused to increase with increasing off time and decreasing time duration of the last on time of the high pressure gas discharge lamp, and the time span of the effectiveness of the additional power increases with increasing off time and with decreasing time duration of the last on time of the high pressure gas discharge lamp.

2. In a process as in claim 1 wherein the status values lamp on and lamp off are formed in dependence on predetermined values of a voltage corresponding to a lamp current.

3. In a process as in claim 2 wherein the lamp actual-power-value is formed by multiplying a lamp voltage by a voltage corresponding to the lamp current.

4. In a process as in claim 3 wherein the maximum additional power is predetermined.

5. In a process as in claim 4 wherein a maximum time span of the effectiveness of the additional power is predetermined.

6. In a process as in claim 5 wherein during the time span of effectiveness of the additional power the additional power has an approximately constant value.

7. In a process as in claim 6 wherein upon completion of the time span of the effectiveness of the additional power the additional power is continuously decreased.

8. In a process as in claim 7 wherein the forming of the desired-power-value for the additional power results from digital or analog storing of characteristic curve fields.

9. In a process as in claim 7 wherein the forming of a desired-power-value for the additional power results by means of exponential functions formed by means of RC members with at least two different time constants.

10. In an apparatus to start a high pressure gas discharge lamp for motor vehicles of a type in which an alternating voltage producer is coupled with a direct voltage source, an ignition device is coupled between the alternating voltage producer and the high pressure gas discharge lamp, a voltage- and/or current-measuring device is in a lamp circuit, and a comparator is coupled for one thing with the voltage- and/or current-measuring device and for another thing with the alternating voltage producer:

the improvement wherein an actual-power-value determining device for one thing is coupled with the current measuring device and the voltage measuring device and for another thing is coupled with the comparator, a desired-power-value determining device that is controlled by time is for one thing coupled via a status determining device with the current measuring device and for another thing is coupled with the comparator, and the desired-power-value determining device has at least two timing members.

11. In an apparatus as in claim 10 wherein the first timing member measures the off time of the high pressure gas discharge lamp.

12. In an apparatus according to claim 11 wherein the second timing member measures the time duration of the last on time of the high pressure gas discharge lamp.

13. In an apparatus according to claim 12 wherein the desired-power-value determining device determines a desired-power-value over a characteristic curve field in dependence on the on and off times under consideration of a maximum lamp start-up current.

14. In an apparatus to start a high pressure gas discharge lamp in motor vehicles of a type having a direct voltage source which is coupled with an alternating voltage producer, an ignition device between the alternating voltage producer and the high pressure gas discharge lamp, a voltage- and/or current-measuring device in a lamp circuit, and a comparator which for one thing is coupled to the voltage- and/or current-measuring device and for another thing is coupled with the alternating voltage producer:

the improvement wherein an actual-power-value determining device for one thing is coupled with the current-measuring device and the voltage-measuring device and for another thing is coupled with the comparator, a time controlled desired-power-value determining device for one thing is coupled via a status determining device with the current-measuring device and for another thing is coupled with the comparator, the desired-power-value determining device has a first condenser wired with blocking members and/or resistors, which, in dependence upon the off times and the time durations of the last on times of the high pressure gas discharge lamp, determines the amplitude of the additional power to the operational power and the desired-power-value determining device has a second condenser wired with blocking members and/or resistors which, in dependence upon the off times and the time durations of the last on times, determines the time span of effectiveness of the additional power to the operational power.

15. In an apparatus as in claim 14 wherein the voltage appearing on the first condenser determines a termination function of the additional power upon completion of the time span of effectiveness of the additional power.

16. In an apparatus as in claim 15 wherein the status determining device is coupled with a control input of a switching device whose switching path can either connect a first reference voltage terminal or ground via a first resistor with a noninverting input of a comparator K, the noninverting input of the comparator is additionally coupled with ground via a second condenser, the inverting input of the comparator is coupled with a second reference voltage terminal, the output of the comparator controls a switch whose switching path can, via an blocking member, couple the first reference voltage terminal for one thing, via a ninth resistor, with the noninverting input of an ideal voltage follower and for another thing, via an eighth resistor, with ground, the noninverting input of the voltage follower is coupled via a first condenser with ground, the output of the voltage follower for one thing is coupled with the inverting input of the voltage follower and for another thing, via a fourteenth resistor, is coupled with the inverting input of a subtractor, the noninverting input of the subtractor is coupled with a third reference voltage terminal and the output of the subtractor for one thing is coupled, via a thirteenth resistor, with the inverting input of the subtractor and, for another thing, with an output to which the comparator is coupled.

* * * * *